June 9, 1959   M. R. SMITH   2,890,168
HYDROCARBON CONVERSION SYSTEM
Filed Oct. 12, 1953
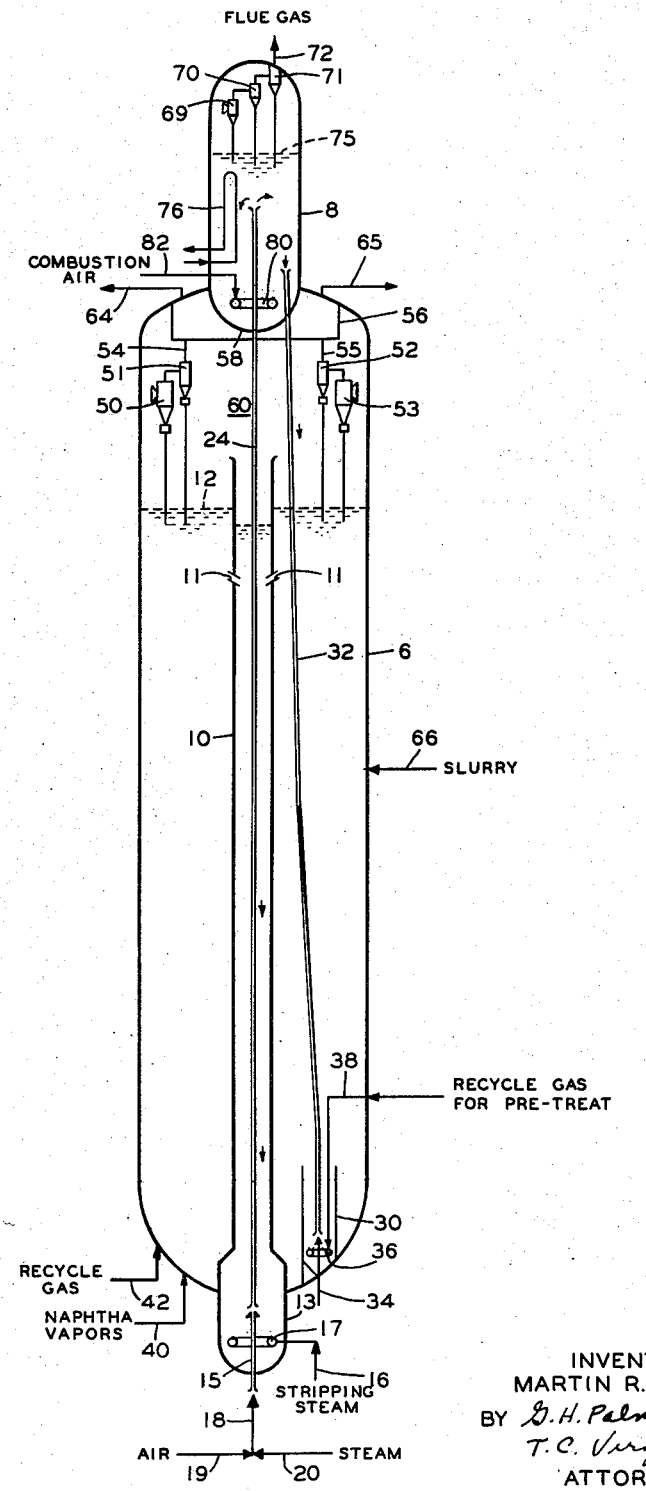
INVENTOR
MARTIN R. SMITH
BY G. H. Palmer
T. C. Virgil
ATTORNEYS United States Patent Office 2,890,168
Patented June 9, 1959

2,890,168

HYDROCARBON CONVERSION SYSTEM

Martin R. Smith, Glen Ridge, N.J., assignor to The M. W. Kellogg Company, Jersey City, N.J., a corporation of Delaware Application October 12, 1953, Serial No. 385,562

14 Claims. (Cl. 208—164)

This invention relates to an improved method and means of operating a fluid system, more particularly, it pertains to a unitary fluid system which is unusally adapted for the conversion of hydrocarbons, more specifically, the system is especially effective for reforming light hydrocarbon oils.

The orthoflow design for fluid systems is a unitary structure in which one processing vessel is superimposed on the other and circulation of catalyst is essentially in vertical directions upwardly and downwardly. The arrangement of processing vessels is important, because it reflects in the cost of fabrication, and it may have a consequent effect upon the efficiency of the operation. In the case of applying the orthoflow design to a hydroforming process, from the standpoint of cost it is important that the reactor is superimposed by the regenerator, since the regenerator is a substantially smaller vessel than the reactor in view of the relatively small regeneration requirement for this kind of process. However, by virtue of this limitation, the position of the stripper relative to the other processing vessels presents a problem when it is desirous of maintaining the flow of catalyst essentially in vertical directions.

It is known that stripping efficiency is enhanced by the use of a higher temperature than exists in the reaction zone of a fluid system. In order to conduct the stripping at a higher temperature, heretofore, one of the practices has been to employ a stripping gas in a quantity and temperature sufficient to effect this purpose. In some instances, the increased stripping efficiency obtained at higher temperatures did not warrant the cost of using stripping gas as the means of attaining this result. By means of the present invention, one proposal is to operate an orthoflow system in a manner whereby the stripping step is effected at a higher temperature than exists in the reaction zone, without necessarily using the stripping gas as the means to attain this purpose.

It is an object of this invention to provide improved method and means for effecting chemical conversions by means of a fluid system.

Another object of this invention is to provide a novel orthoflow system for a fluid operation in which the reactor is superimposed by the regenerator and the circulation of catalyst is effected essentially in a vertical direction.

Still another object of this invention is to provide an improved orthoflow system for fluid operations wherein stripping is conducted at a higher temperature than exists in the reaction zone without using the stripping gas as a means for effecting this purpose. Alternatively, the stripping gas can be introduced at a substantially lower temperature than has been used heretofore conventionally and the stripping operation can be practiced at essentially the same temperature as used heretofore conventionally.

Other objects and advantages of this invention will become apparent from the following description and explanation thereof.

In accordance with the present invention, an orthoflow system is provided with comprises a reaction means adapted for containing a fluidized mass of finely divided solids, a separate regeneration means superimposed on said reaction means and adapted to contain finely divided solids, stripping means situated within said reaction means and adapted for receiving finely divided solids therefrom for downward flow therein, an upflow transfer means situated within said stripping means and adapted for conveying solids from the stripping means to the regeneration means, a downflow transfer means situated within said reaction means and adapted to convey solids from the regeneration means to the reaction means, means for introducing gasiform material into said regeneration means and means for introducing lift gas into said upflow transfer means.

Another aspect of this invention is concerned with a process which comprises contacting a chemical reactant with a fluidized mass of finely divided solid contact material in a reaction zone to produce the desired product and thus contaminate the contact material with a combustible deposit, separating the product thus produced from the contact material, passing a portion of the contact material to a stripping zone wherein it is contacted with a stripping gas to remove volatile material therefrom, passing the contact material from the stripping zone which is surrounded by the contact material to an upflow transfer zone and wherein the oxygen containing gas is supplied to burn at least part of the combustible material and the heat thus produced is exchanged indirectly with the contact material in the stripping zone, passing the contact material from the upflow transfer zone to an elevated zone wherein the contact material forms a dense fluidized mass, and passing a portion of the contact material from the elevated zone to a downflow transfer zone whereby the contact material is returned to the reaction zone.

The method and means of the present invention are applicable for use in a variety of processes, generally, chemical conversions such as, for example, the synthesis of hydrocarbons by hydrogenation of carbon oxides; nitration of hydrocarbons; hydrocarbon conversions, e.g., desulfurization, hydrogenation, catalytic cracking, cracking under hydrogen pressure, dehydrogenation, etc. Among the various uses of the present invention, the hydroforming process is especially adapted thereto.

In a hydroforming system, a light hydrocarbon oil, e.g., gasoline, naphtha and kerosene, are contacted with a mass of finely divided reforming catalyst at an elevated temperature and pressure whereby the oil feed is converted to a high anti-knock gasoline product. The catalyst used for this purpose is usually one having the property of catalyzing aromatic formation or a catalyst which has the properties of dehydrogenation and hydrogenation. Generally, the catalyst suitable for this purpose are the compounds of metals of groups V and VI of the periodic table, more particularly, the oxides and/or sulfides of the left-hand elements of groups VI, namely, chromium, molybdenum, tungsten. These catalytic elements are used alone, or they are supported on a carrier material, such as silica, alumina, silica-alumina, zinc spinel, bauxite, kieselguhr, pumice, etc. Another class of catalysts which are used extensively for hydroforming reactions is the noble metals, e.g., platinum, palladium, etc. The noble metals are used alone or they are supported on suitable carrier materials, such as alumina, silica, activated carbon, etc. In the case of using as catalyst a compound of a metal of groups V and VI of the periodic table, the catalytic element in the catalyst comprises about 0.1 to about 25% by weight of the total material, more usually, about 1 to about 10% by weight, on the same basis. The noble metals can be used in the same concentrations just described, however, more usually, they comprise about .05 to about 5% by weight of the total catalyst.

The catalyst of this invention is used in a finely divided state, generally, the particles are not more than about 250 microns in size, more usually, the catalyst particles are about 10 to about 100 microns in size. The finely divided catalyst is fluidized in the conventional manner in order to provide a dense fluidized system. In general, the superficial linear gas velocity is about 0.1 to about 40 feet per second, although, more usually, the superficial linear gas velocity is about 0.1 to about 6 feet per second. For conventional applications, it is preferred to employ a superficial linear gas velocity of about 1 to about 2.5 feet per second.

The reforming reaction is usually conducted at a temperature of about 750° to about 1075° F., more usually, about 875° to about 950° F. The reaction is conducted in the presence of hydrogen in order to derive the benefits of hydrogen in suppressing carbon formation. A superatmospheric pressure is employed, generally, in the range of about 25 to about 1000 p.s.i.g., more usually, about 50 to about 500 p.s.i.g. The amount of hydrogen added to the process is measured in terms of standard cubic feet (60° F. and 760 mm.) of hydrogen per barrel of oil feed, which is abbreviated as s.c.f.b. For the purposes of hydroforming, the hydrogen rate is about 500 to about 15,000 s.c.f.b., more usually about 1000 to about 7500 s.c.f.b. The ratio of oil feed to catalyst in the system is designated in terms of the weight space velocity and this is defined as the pounds of oil feed to the reaction zone on an hourly basis per pound of catalyst which is present therein. The weight space velocity varies from about .05 to about 10, more usually, about .25 to about 2.5. Another important operating condition in the fluid system is the catalyst to oil ratio measured on a weight basis. In a reforming system, the catalyst to oil ratio can vary from about .1 to about 10, more usually, about .25 to about 2.

In order to have a better understanding of my invention, reference will be had to the accompanying drawings which form a part of this specification.

In the drawing the figure is an illustrative embodiment of the orthoflow system of this invention.

In the figure, reactor 6 is a vertical, cylindrical vessel have a straight side length of 104 feet and an internal diameter of 23 feet, four inches. By virtue of the insulation, the effective diameter is 22½ feet. The regenerator 8 is superimposed on reactor 6, and it is also a vertical, cylindrical vessel having straight side length of 65 feet and an internal diameter of 10 feet 10 inches. However, due to the inside insulation (not shown) of the regenerator the effective diameter is 10 feet. In a concentric position within the reactor 6, there is located a vertical, cylindrical stripper 10 having a length of 85 feet and an internal diameter of 4 feet, 1 inch. At a distance of 20 feet from the top of the stripper, there are situated openings or louvers 11 which permit the passage of finely divided solids from the reactor bed having a level 12 to the stripper. Stripper 10 is connected at its bottom end to an enlarged section 13, part of which is situated outside reactor 6. Within the bottom part of section 13 of the stripper, there is situated a hollow stemmed valve 15. Also within this portion of section 13 there is found a donut shaped distributor 17 which contains a series of openings or perforations in the bottom side for the entry of stripping steam or stripping gas which is supplied by means of a line 16. Lift gas is supplied to the hollow stemmed valve 15 by means of a line 18 and this line is in turn connected to an air line 19 and a steam line 20. Section 13 of the stripper has an internal diameter of 6 feet.

Concentrically disposed within stripper 10 is a vertical, cylindrical vessel or riser 24. This riser 24 extends from just above the hollow stemmed valve 15 to a point in the middle section of regenerator 8. To one side of stripper 10 there is located a well 30 having an internal diameter of 3 feet and a length of 12 feet. This well rests on the bottom of reactor 6, and it serves as the pre-reducing zone for regenerated catalyst. A cylindrical conduit or standpipe 32 has its bottom end situated within the pretreater or well 30, and its upper end is located within the bottom part of regenerator 8. The rate of catalyst flowing from the bottom of regenerator 8 to pretreater 30 is automatically controlled by means of a plug valve 34. Plug valve 34, which is situated within the bottom part of pretreater 30 is of the movable type, and it serves to regulate the size of the opening in standpipe 32. Also situated within the bottom of pretreater 30 is a donut shaped distributor 36 having a series of openings or perforations (not shown) in the bottom side for the passage of hydrogen containing gas to be used in the pretreatment or pre-reduction operation. The hydrogen containing gas is supplied to distributor 36 by means of an air line 38.

On the other side of stripper 10, recycle gas is introduced into the bottom of reactor 6 by means of line 42 and vaporous naphtha feed is charged thereto via line 40. In this particular system, a considerable amount of heat which is required for the reforming reaction is supplied by means of the recycle gas. Accordingly, the recycle gas is introduced at a significantly higher temperature than the reaction temperature.

In the upper part of reactor 6, there is situated cyclones 50 and 51 in series at one side of riser 24 and cyclones 52 and 53 in series on the other side of riser 24. The outlets 54 and 55 of secondary cyclones 50 and 51, respectively, are connected to an enclosure means or a plenum chamber 56. The plenum chamber is constructed to seal the bottom end 58 of regenerator 8 from direct contact with the disengaging zone 60 of reactor 6. By having a plenum chamber, the reaction product must pass therethrough and, hence, a stagnant layer of reaction product vapor does not collect in the upper part of disengaging zone 60. The reaction product vapors are discharged from plenum chamber 56 by means of lines 64 and 65. A catalyst slurry from the product recovery system (not shown) is recycled to the reaction zone by means of a line 66.

Within the top part of regenerator 8, there is situated cylcones 69, 70 and 71 which are in series, and the flue gas is discharged therefrom by means of a line 72 which leads from the top of the regenerator. A mass of fluidized catalyst is maintained within the regenerator and it has a level 75. The temperature of the regenerator is controlled by means of cooling tubes shown schematically as 76. Combustion air is introduced in to the bottom part of regenerator 80 by means of a donut shaped distributor 80. Combustion air is supplied to the donut shaped distributor by means of a line 82. The openings in the distributor 80 are located in the bottom side in order to minimize erosion.

In operation, 351,940 pounds per hour of oil feed vapors having a molecular weight of 109.1 are supplied via line 40 at a temperature as high as 1000° F. Hydrogen containing gas or recycle gas is recycled from the product recovery system (not shown) by means of line 42 at the rate of 190,556 pounds per hour. This gas has a molecular weight of 12.8 and it is at a temperature as high as 1200° F. The combination of oil feed vapors and hydrogen containing gas passes upwardly through catalyst bed in the reactor 6 having a level 12. The catalyst comprises 9% by weight of molybdenum trioxide supported on alumina. This catalyst is in a finely divided state having a particle size in the range of about 10 to about 100 microns. The catalyst bed in reactor 6 exists at an average temperature of about 940° F. and at a pressure of about 225 p.s.i.g. Approximately 475 tons of catalyst are situated within the reactor, and it occupies a height of about 76 feet. By virtue of the total reactant materials passing upwardly through the catalyst bed in the reactor at an exit superficial linear velocity of 1 foot per second, the fluidized catalyst has a density of 32 pounds per cubic foot. 132 barrels per day of slurry having an API gravity of 43.80 are recycled to the reactor via line 66. The slurry of catalyst contains 318 pounds per hour of catalyst and 1540 pounds per hour of polymer. The polymer is the product fraction boiling above the desired gasoline fraction. In this instance, the gasoline has an end point of about 400° F. The reaction conditions specified provide a weight space velocity of 0.35.

Spent catalyst containing about 3% by weight of carbon or coke is continuously withdrawn from the upper part of the reaction zone through louvers 11 of stripper 10. The catalyst flows downwardly in the annular space formed between stripper 10 and riser 24. Stripping gas, such as steam, is introduced into the stripper by means of line 16 at the rate of 6619 pounds per hour, and it exists at an average temperature of 600° F. The steam passes upwardly in countercurrent contact with the downflowing catalyst in the stripper, hence, volatile hydrocarbon material is removed therefrom and it passes overhead from the stripper to the disengaging zone 60. An average temperature of 930° F. is maintained in the stripper. Generally, stripping is conducted under dense phase conditions, and in this instance, the density is 36 pounds per cubic foot. The rate of catalyst withdrawal from the reaction zone to the stripper produce a catalyst to oil ratio of 0.65. The downflowing catalyst in stripper 10 reaches section 13 wherein it is swept upwardly by means of lift gas flowing through hollow stem 15 and flows upwardly through riser 24. Air is supplied to hollow stem 15 by means of line 19 at the rate of 9000 pounds per hour and at a temperature of 280° F. Ssteam may also be supplied to hollow stem 15 by means of line 20 at the rate of 5600 pounds per hour, and at a temperature of 600° F., or a mixture of the air and steam may be employed. The air in contact with spent catalyst in riser 24 burns part of the carbon deposited thereon such that an average temperature of about 1050° F. is reached in riser 24. Since the temperature in riser 25 is higher than the average temperature in the stripping zone, there is an indirect exchange of heat such that the stripper is maintained at an average temperature of 930–945° F., depending upon the amount of catalyst passing through, and the carbon content thereon, and the temperature of the steam being introduced.

The velocity of air and steam passing upwardly through riser 24 serves to carry the catalyst to the regenerator 8 at a superficial linear gas velocity of 12–20 feet per second, hence, the density of the suspension in this riser is 10–15 pounds per cubic foot. The suspension of spent catalyst in air, steam and combustion products flows into the middle part of regenerator 8. In the regenerator, an average temperature of 1100° F. is maintained at a pressure of about 215 p.s.i.g. The temperature is controlled by means of indirect cooling through tubes shown schematically as 76. Combustion air is fed into the bottom part of the regenerator by means of line 82 at the rate of 47,000–56,000 pounds per hour and at a temperature of 280° F. The superficial linear gas velocity of the upflowing materials in the regenerator is 0.5 foot per second, and it produces a dense phase having a density of 33 pounds per cubic foot. The regenerator contains about 32 tons of catalyst and as a result of combustion of the carbonaceous deposit, the catalyst is regenerated to contan about 0.1% by weight of carbon. The flue gas resulting from regeneration is discharged from the system by means of line 72 at the rate of 58,555 pounds per hour. This flue gas has a molecular weight of 28.5.

The regenerated catalyst is removed from the bottom part of the regenerator 8 by means of standpipe 32 at the rate of 216,000 pounds per hour. The catalyst in standpipe 32 exists as a dense phase, e.g., 35 pounds per cubic foot. The regenerated catalyst leaves the regeneration zone at a temperature of 1100° F., however, due to the standpipe being situated within the reaction zone, heat is indirectly exchanged therewith, hence the sensible heat of regenerated catalyst furnishes part of the endothermic heat of reaction. Further, pretreatment of catalyst with hydrogen should preferably occur at a temperature not more than about 1000° F. Hence, the present design serves to cool the regenerated catalyst to a temperature of less than 1000° F. for favorable pre-reduction. The regenerated catalyst is in a highly oxidized state, consequently, it is discharged into the hydrogen pretreater 30 wherein it is contacted with a hydrogen containing gas of the same composition as the gas being supplied in line 42 to the reaction zone. This recycle gas is at a temperature of 800–1200° F. and it is supplied at the rate of 4660 pounds per hour. The average temperature in the pretreater zone 30 is about 940° F. The prereduced catalyst flows overhead from well 30 and enters the bottom part of the reactor bed.

It is to be noted that by reason of the present design, the upflow riser 24 and stripper 10 are centrally located within reactor 6. Furthermore, riser 24 is concentrically located within stripper 10. By reason of this design, the regenerator 8 is superimposed in a central position on reactor 6. This arrangement of vessels provides for cheap construction costs. Further, the flow of catalyst is essentially in a vertical direction, by means of this arrangement. Furthermore, the downflow standpipe 32 is situated in an essentially vertical plane such that a minimum of resistance is offered to the flow of catalyst therein. Accordingly, this standpipe contains regenerated catalyst in a dense phase thus permitting pressure build-up which is necessary for an adequate differential across the plug valve at the end of the standpipe. The arrangement of riser 24 with respect to stripper 10 provides for an indirect exchange of heat from the riser to the stripper, consequently, the quantity of air being supplied to riser 24 can be varied to maintain an average temperature of about 930° to about 1100° F., and in turn the temperature in the stripper can vary from about 930° to about 945° F. It is to be noted that the temperature in the stripper can be higher or lower than the temperature in the reactor. A lower temperature can be obtained by using a stripping gas at a substantially lower temperature than exists in the reactor. On the other hand, the temperature in the stripper can be controlled at a higher level than exists in the reactor in order to improve the efficiency of the stripping operation. In this kind of an operation, the temperature in the stripper can be maintained at about 5° to about 15° F. higher than exists in the reactor.

Having thus provided a description of my invention, it should be understood that no undue limitations or restrictions are to be imposed by reason thereof, but that the scope of the present invention is defined by the appended claims.

I claim:

1. A process which comprises contacting a chemical reactant with a dense fluidized mass of finely divided solid contact material in a reaction zone to produce a desired product and contaminating the contact material with a combustible material, separating the product thus produced from the contact material, passing a portion of the catalyst from the upper portion of the reaction zone downwardly through a confined stripping zone to the bottom of the reaction zone wherein it is contacted with a stripping gas to remove volatile material therefrom, passing the stripped contact material to an upflow transfer zone which is surrounded by the contact material in the stripping zone and wherein an oxygen containing gas is supplied to burn at least part of the combustible material and the heat thus produced is exchanged indirectly with the contact material in the stripping zone, thereby maintaining a greater temperature in the stripping zone than the reaction zone, passing the upflow contact material to an elevated zone wherein the contact material forms a dense fluidized mass, passing a portion of the contact material from the elevated zone to a downflow transfer zone whereby the contact material is returned to the reaction zone.

2. A process which comprises contacting a chemical reactant with a fluidized mass of finely divided solid contact material in a reaction zone to produce a desired product and contaminating the contact material with a combustible material, separating the product thus produced from the contact material, passing a portion of the catalyst from the upper portion of the reaction zone downwardly through a confined stripping zone to the bottom of the reaction zone wherein it is contacted with a stripping gas to remove volatile material therefrom, passing the stripped contact material to an upflow transfer zone which is surrounded by the contact material in the stripping zone and wherein an oxygen containing gas is supplied to burn a part of the combustible material and the heat thus produced is exchanged indirectly with the contact material in the stripping zone, thereby maintaining a greater temperature in the stripping zone than the reaction zone, passing the upflowing contact material from the upflow transfer zone to an elevated regeneration zone wherein the contact material forms a dense fluidized mass and is further contacted with an oxygen containing gas to burn additional quantities of combustible material, passing a portion of the contact material from the regeneration zone to a downflow transfer zone whereby the contact material is returned to the reaction zone.

3. A hydrocarbon conversion process which comprises contacting a hydrocarbon reactant with a dense fluidized mass of finely divided hydrocarbon conversion catalyst in a reaction zone to produce the desired product and contaminating the catalyst with a carbonaceous material, separating the reaction product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing the stripped catalyst from the stripping zone to an upflow transfer zone which is surrounded by the catalyst in the stripping zone wherein an oxygen containing gas is supplied to burn at least part of the carbonaceous material on the catalyst and the heat thus produced is exchanged indirectly with the catalyst in the stripping zone, thereby maintaining a greater temperature in the stripping zone than the reaction zone, passing the catalyst from the upflow transfer zone to an elevated zone wherein the catalyst forms a dense fluidized mass, passing a portion of the catalyst from the elevated zone to a downflow transfer zone whereby the catalyst is returned to the reaction zone.

4. A hydrocarbon conversion process which comprises contacting a hydrocarbon reactant with a dense fluidized mass of finely divided hydrocarbon conversion catalyst in a reaction zone to produce a desired product and contaminating the catalyst with a carbonaceous material, separating the reaction product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing a stripped catalyst from the stripping zone to an upflow transfer zone which is surrounded by the catalyst in the stripping zone and wherein an oxygen containing gas is supplied to burn part of the carbonaceous material and the heat thus produced is exchanged indirectly with the catalyst in the stripping zone, thereby maintaining a greater temperature in the stripping zone than in the reaction zone, passing the catalyst from the upflow transfer zone to an elevated regeneration zone wherein the catalyst forms a dense fluidized mass and it is contacted with an additional quantity of oxygen containing gas in order to remove the desired quantity of carbonaceous material therefrom, passing the catalyst from the regeneration zone to a downflow transfer zone whereby the contact material is returned to the reaction zone.

5. A reforming process which comprises contacting a light hydrocarbon oil with a dense fluidized mass of finely divided reforming catalyst in a reaction zone to produce a reformed product and thus contaminating the catalyst with a carbonaceous material, separating the reformed product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing the catalyst from the stripping zone to an upflow transfer zone which is surrounded by the catalyst in the stripping zone, passing oxygen containing gas to said upflow transfer zone to burn at least part of the carbonaceous material on the catalyst and the heat thus produced is exchanged indirectly with the catalyst in the stripping zone, thereby maintaining a greater temperature in the stripping zone than in the reaction zone, passing the catalyst from the upflow transfer zone to an elevated zone wherein the contact material forms a dense fluidized mass, passing a portion of the catalyst from the elevated zone to a downflow transfer zone whereby the catalyst is returned to the reaction zone.

6. A reforming process which comprises contacting a light hydrocarbon oil with a fluidized mass of finely divided reforming catalyst in a reaction zone to produce a reformed product and thus contaminating the catalyst with a carbonaceous material, separating the reformed product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing the catalyst from the lower portion of said stripping zone to an upflow transfer zone, passing an oxygen containing gas to said upflow transfer zone to burn part of the carbonaceous material from the catalyst and the heat thus produced is exchanged indirectly with the catalyst in the stripping zone, thereby maintaining a greater temperature in the stripping zone than the reaction zone, passing the catalyst from the upflow transfer zone to the lower portion of an elevated regeneration zone wherein the catalyst forms a dense fluidized mass contacting said catalyst with an oxygen containing gas to burn the desired quantity of carbonaceous material therefrom, and passing a portion of the catalyst from the regeneration zone to a downflow transfer zone whereby the catalyst is returned to the reaction zone.

7. A hydroforming process which comprises contacting a naphtha fraction with a fluidized mass of finely divided molybdenum oxide catalyst in a reaction zone to produce a reformed product and thus contaminating the catalyst with a carbonaceous material, separating the reformed product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing the catalyst from the stripping zone to an upflow transfer zone which is surrounded by the catalyst in the stripping zone and wherein an oxygen containing gas is supplied to burn part of the carbonaceous material from the catalyst and the heat thus produced is exchanged indirectly with the catalyst in the stripping zone, thereby maintaining a stripping temperature of about 5° to about 15° F. greater than the reaction temperature, passing the catalyst from the upflow transfer zone to an elevated regeneration zone wherein the catalyst forms a dense fluidized mass and it is contacted with an oxygen containing gas to burn the desired quantity of carbonaceous material from the catalyst, and passing a portion of the catalyst from the regeneration zone to a downflow transfer zone whereby the catalyst is returned to the reaction zone.

8. A hydroforming process which comprises contacting a naphtha fraction with a fluidized mass of finely divided molybdenum oxide catalyst in a reaction zone to produce a reformed product and thus contaminating the catalyst with carbonaceous material, separating the reformed product from the catalyst, passing a portion of the catalyst from the upper portion of the reaction zone downwardly through a confined stripping zone to the bottom of the reaction zone wherein it is contacted with a stripping gas to remove volatile hydrocarbons therefrom, passing the catalyst from the stripping zone to an upflow transfer zone which is surrounded by the catalyst in the stripping zone and wherein an oxygen gas is supplied to burn part of the carbonaceous material from the catalyst and the heat thus produced is exchanged indirectly with the catalyst in the stripping zone, thereby the temperature in the stripping zone is greater than the temperature in the reaction zone, passing the catalyst from the upflow transfer zone to an elevated regeneration zone wherein the catalyst forms a dense fluidized mass and it is contacted with an oxygen containing gas to burn the desired quantity of carbonaceous material from the catalyst, passing a portion of the catalyst from the regeneration zone to a downflow transfer zone, passing the catalyst from the downflow transfer zone to a pretreating zone situated within the reaction zone and to which there is charged a hydrogen containing gas for treatment of the catalyst, and passing the catalyst from the pretreating zone to the reaction zone.

9. An apparatus comprising in combination a reaction means adapted for containing a fluidized mass of finely divided solids, a separate regeneration means superimposed on said reaction means and adapted to contain finely divided solids, a solid static plenum means positioned between the bottom of said regeneration means and the interior of said reaction means, means for passing gasiform material from said reaction means to said plenum means, means for discharging gasiform material from said plenum means, an elongated stripping means of smaller cross-section than said reaction means positioned vertically and within said reaction means extending in open communication from the bottom to the upper portion of said reaction means adapted to emit stripping gases above the dense phase of finely divided solids therein and adapted for receiving finely divided solids therefrom for downward flow therein, an upflow transfer means situated within said stripping means and adapted for conveying solids from the stripping means to the regeneration means, a downflow transfer means situated within said reaction means and adapted to convey solids from the regeneration means to the reaction means, means for introducing gasiform material to said reaction means, means for introducing gasiform material to said regeneration means, means for introducing stripping gas to said stripping means, and means for introducing lift gas to said upflow transfer means.

10. An apparatus comprising in combination a reaction means adapted for containing a dense fluidized mass of finely divided solids, a separate regeneration means superimposed on said reaction means and adapted to contain finely divided solids, a solid static plenum means positioned between the bottom of said regeneration means and the interior of said reaction means, means for passing gasiform material from said reaction means to said plenum means, means for discharging gasiform material from said plenum means, an elongated stripping means of smaller cross-section than said reaction means positioned vertically and within said reaction means extending in open communication from the bottom to the upper portion of said reaction means adapted to emit stripping gases above the dense phase of finely divided solids therein and adapted for receiving finely divided solids therefrom for downward flow therein, a vertical cylindrical transfer means concentrically disposed within said stripping means and adapted for conveying solids from the stripping means to the regeneration means, a downflow transfer means situated within said reaction means and adapted to convey solids from the regeneration means to the reaction means, means for introducing gasiform material into said reaction means, means for introducing gasiform material into said regeneration means, means for introducing stripping gas into said stripping means, and means for introducing lift gas into said upflow transfer means.

11. An apparatus comprising in combination a reaction means adapted for containing a dense fluidized mass of finely divided solids, a separate regeneration means of reduced cross-sectional area than said reaction means and centrally superimposed on said reaction means and adapted to contain finely divided solids, a solid static plenum means positioned between the bottom of said regeneration means and the interior of said reaction means, means for passing gasiform material from said reaction means to said plenum means, means for discharging gasiform material from said plenum means, an elongated stripping means of smaller cross-section than said reaction means positioned vertically and within said reaction means extending in open communication from the bottom to the upper portion of said reaction means adapted to emit stripping gases above the dense phase of finely divided solids therein and adapted for receiving finely divided solids therefrom for downward flow therein, an upflow vertical cylindrical transfer means concentrically disposed within said stripping means and adapted for conveying solids from the stripping means to the regeneration means, a downflow transfer means situated within said reaction means and adapted to convey solids from the regeneration means to the reaction means, means for introducing gasiform material into said reaction means, means for introducing gasiform material into said regeneration means, means for introducing stripping gas into said stripping means, and means for introducing lift gas into said upflow transfer means.

12. An apparatus comprising in combination a vertical cylindrical reactor adapted for containing a dense fluidized mass of finely divided solids, a separate vertical cylindrical regenerator superimposed on said reactor and adapted to contain finely divided solids, a solid static plenum chamber associated with the bottom of the regenerator and positioned between the bottom of said regenerator and the interior of the reactor, means for passing gasiform material from the reactor to the plenum chamber, means for discharging gasiform material from the plenum chamber, an elongated stripper of smaller cross-section than said reactor positioned vertically and within said reactor extending in open communication from the bottom to the upper portion of said reactor adapted to emit stripping gases above the dense phase of finely divided solids therein and adapted for receiving finely divided solids therefrom for downward flow therein, an upflow vertical cylindrical conduit situated within said stripper and adapted for conveying solids from the stripper to the lower portion of said regenerator, a downflow vertical cylindrical conduit situated within said reactor and adapted to convey solids from the regenerator to the reactor, means for introducing gasiform material into said reactor, means for introducing gasiform material into said regenerator, means for introducing stripping gas into said stripper, and means for introducing lift gas into said upflow conduit.

13. An apparatus comprising in combination a vertical cylindrical reactor adapted for containing a dense fluidized mass of finely divided solids, a separate vertical cylindrical regenerator of reduced cross-sectional area than the reactor centrally superimposed on said reactor and adapted to contain a fluidized mass of finely divided solids, a solid static plenum chamber associated with the bottom of the regenerator and positioned between the bottom of said regenerator and the interior of the reactor, means for passing gasiform material from the reactor to the plenum chamber, an elongated stripper of smaller cross-section than said reactor positioned vertically and within said reactor extending in open communication from the bottom to the upper portion of said reactor adapted to emit stripping gases above the dense phase of finely divided solids therein and adapted for receiving finely divided solids therefrom for downward flow therein, an upflow vertical cylindrical conduit concentrically disposed within said stripper and adapted for conveying solids from the stripper to the regenerator, a downflow cylindrical conduit situated within said reactor and adapted to convey solids from the regenerator to the reactor, means for introducing gasiform material into said reactor, means for introducing gasiform material into said regenerator, means for introducing stripping gas into said stripper, and means for introducing lift gas into said upflow conduit.

14. An apparatus comprising in combination a reaction means adapted for containing a dense fluidized mass of finely divided solids, a separate regeneration means superimposed on said reaction means and adapted to contain finely divided solids, a solid static plenum means positioned between the bottom of said regeneration means and the interior of said reaction means, means for passing gasiform material from said reaction means to the plenum means, means for discharging gasiform material from the plenum means, an elongated stripping means of smaller cross-section than said reaction means positioned vertically and within said reaction means extending in open communication from the bottom to the upper portion of said reaction means adapted to emit stripping gases above the dense phase of finely divided solids therein and adapted for receiving finely divided solids from the upper portion thereof for downward flow therein, an upflow transfer means situated within said stripping means and adapted for conveying solids from the lower portion of the stripping means to the lower portion of the regeneration means, a pretreating means situated within the bottom of said reaction means, a downflow transfer means situated within said reaction means having the lower end thereof positioned within said pretreating means and adapted to convey solids from the regeneration means to the pretreating means, means for introducing gasiform material to said pretreating means, means for introducing gasiform material to said reaction means, means for introducing gasiform material to said regeneration means, means for introducing stripping gas to said stripping means, and means for introducing lift gas to said upflow means.

References Cited in the file of this patent

UNITED STATES PATENTS

| | | |
|---|---|---|
| 2,457,232 | Hengstebeck | Dec. 28, 1948 |
| 2,597,346 | Leffer | May 20, 1952 |
| 2,602,771 | Munday et al. | July 8, 1952 |
| 2,710,827 | Goronowski | June 14, 1955 |
| 2,735,803 | Leffer | Feb. 21, 1956 |